United States Patent Office 3,468,865
Patented Sept. 23, 1969

3,468,865
POLYMERIZATION AND CATALYSTS
Edgardo Santiago, Toledo, Ohio, assignor to Owens-Illinois, Inc., a corporation of Ohio
No Drawing. Filed Dec. 23, 1966, Ser. No. 604,159
Int. Cl. C08f 1/42; C08d 1/14
U.S. Cl. 260—94.3                              35 Claims

ABSTRACT OF THE DISCLOSURE

Disclosed is a polymerization catalyst system comprising certain hydrocarbylsilyl chromates in combination with hydrocarbylsilanes and either an aluminum trihalide or a hydrocarbyloxy aluminum halide.

---

This invention relates to new catalyst systems. In another aspect the invention relates to polymerization of unsaturated hydrocarbons. In a more specific aspect the invention concerns a method for polymerization of polymerizable olefinically unsaturated hydrocarbons containing at least one terminal carbon-to-carbon double bond. In a still more specific aspect the invention relates to a catalyst system comprising a hydrocarbylsilylchromate compound, together with certain silanes and certain aluminum compounds, as well as to the polymerization of unsaturated hydrocarbons using same.

It is an object of the present invention to provide a new catalyst system useful for polymerization of olefinically unsaturated monomers.

It is a further object of the present invention to provide a new process for the polymerization of such monomers.

Other objects, as well as aspects and advantages, of the invention will become apparent from a study of the accompanying specification.

According to the present invention, there is provided a catalyst system comprising a mixture of (1) hydrocarbylsilylchromate compound, (2) certain aluminum halide compounds and (3) hydrocarbon silicon compounds containing Si-H bonds.

Hydrocarbylsilylchromate compounds useful in the catalyst system of the invention are characterized by the presence therein of the group of the formula

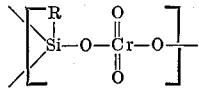

wherein R is a hydrocarbyl group having from 1 to 14 carbon atoms.

The unattached valencies of the silicon atom shown are usually attached to an oxygen of a

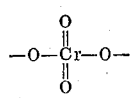

group or a

group or to another R group as before defined. For instance, there can be mentioned the compounds

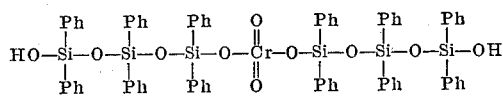

and

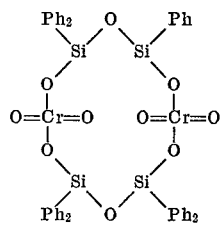

where Ph is phenyl. Other examples are such polymeric compounds as polydicyclohexylsilylchromate (Ch is cyclohexyl),

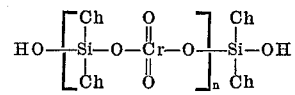

where $n$ is a positive whole number, and polydiethylsilylchromate.

Among the preferred compounds containing the group

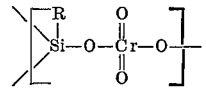

are the bis(trihydrocarbylsilyl)chromates,

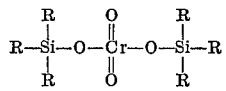

where R is a hydrocarbyl group as before defined. Illustrative thereof are alkyl, alkenyl, cycloalkyl, aryl, alkaryl and aralkyl groups, such as methyl, ethyl, vinyl, propyl, allyl, iso-propyl, butyl, butenyl, isobutyl, tertiary butyl, pentyl, hexyl, octyl, nonyl, decyl decenyl, phenyl, benzyl, phenylethyl, tolyl, xylyl, napthyl, cyclohexyl, methylcyclohexyl and cyclopentyl.

Other specific examples of silylchromates useful in the catalyst compositions of this invention are bis(trimethylsilyl) chromate, bis(triethylsilyl)chromate, bis(tri-n-propylsilyl)chromate, bis(triisopropylsilyl)chromate, bis(tributylsilyl)chromate, bis(trihexylsilyl)chromate, bis(trinonylsilyl)chromate, bis(triphenylsilyl)chromate, bis(tribenzylsilyl)chromate, bis(tricyclohexylsilyl)chromate and bis(tributenylsilyl)chromate; bis(triisopentylsilyl) chromate, bis(tri-2-ethylhexylsilyl)chromate, bis(tridecylsilyl)chromate, bis[tri(tetradecyl)silyl]chromate, bis (triphenylsilyl)chromate, bis(tritolylsilyl)chromate, bis (trixylylsilyl)chromate, bis[tri(ethylphenyl)silyl]chromate, bis(methyldiphenylsilyl)chromate, bis(tri-p-tolylsilyl)chromate, bis(cyclohexyldiphenylsilyl)chromate, bis(tri-2-methylpentylsilyl)chromate and bis(p - tolyldiphenylsilyl)chromate.

The silicon hydrides that can be used in the present invention can be represented by the general formula $R'_{4-n}SiH_n$ wherein $n$ is an integer from 1 to 3 and R' is a hydrocarbon group containing from 1 to 10 carbon atoms, for instance, an alkyl, alkenyl, aryl, aralkyl, cycloalkyl or alkaryl group, such as ethyl, n-propyl, iso-propyl, allyl, propenyl, phenyl and benzyl. These compounds are named as derivatives of silane, $SiH_4$. Specific examples are diphenyl silane, triphenyl silane, di-1-napthyl silane, phenylsilane, triethylsilane, triisopropylsilane, tri(n-propyl)silane, diphenylmethylsilane, dibenzylsilane, triallylsilane, tri(n-hexyl)silane, tribenzylsilane, trimethylsilane and tributylsilane. Especially preferred are the compounds $R'_{4-n}SiH_n$ where each R' is an aliphatic hydrocarbon group having 1 to 6 carbon atoms.

The aluminum halide compounds that comprise the third component of the catalyst composition of the invention have the formula

where X is a halogen with an atomic number from 17 to 53, G is X or a radical —OR′ where R′ is as before defined. Compounds AlX₃ are generally preferred. Examples of such compounds are AlCl₃, AlBr₃, AlI₃, dichloroethoxyaluminum, dibromophenoxyaluminum, chlorodimethoxyaluminum, dichlorobutoxyaluminum and dichlorophenylethoxyaluminum.

It is convenient to effect the polymerization of the monomers while the catalyst components are dispersed (dissolved or suspended as a particulate solid) in an inert liquified diluent. However, it is not necessary, in order to obtain polymerization of the monomer to a polymer, to employ a diluent or solvent. The diluents that can be used in the process include, for example, aliphatic hydrocarbons, cycloaliphatic hydrocarbons, aromatic hydrocarbons and halogenated hydrocarbons. Examples of of suitable inert diluents that can be employed include organic solvents such as benzene, toluene, n-heptane, cyclohexane and carbon tetrachloride. The particular diluent is not critical so long as it is not reactive with the components of the catalyst.

It is a feature of the invention that high pressures are not necessary, although their use is not detrimental. It is, however, an advantage that pressures from subatmospheric to less than 300 p.s.i.g. are perfectly satisfactory.

While the catalyst composition is described herein as a mixture of the three components, the composition herein and in the claims covers whatever reaction product is formed, if any, when such components are admixed.

The process of the invention is especially advantageous when ethylene or 1,3-butadiene is the monomer. The polymers can be employed for the many known uses of plastic and rubbery high polymers. For instance, the polymers are thermoplastic and can be pressure molded to form articles such as bowls, tumblers, etc. The polymers of conjugated dienes can also be molded and vulcanized with conventional rubber vulcanization accelerators and sulfur to form tough molded articles. The polymers can also be extruded to form tubing for carrying water in laboratories and homes.

The following examples of the invention are illustrative only and are not to be considered as limiting the scope of the invention in any manner.

EXAMPLE I

A one gallon stirred stainless steel autoclave was charged with 1 liter of dry n-heptane containing 2 grams of AlCl₃ and 3 grams triethylsilane, and the dispersion was heated for ½ hour at 176° F. under a dry nitrogen purge. Bis(triethylsilyl) chromate (0.8 gram) was added to 1 liter of dry n-heptane and this dispersion added to the autoclave under a nitrogen purge. The autoclave contents were stirred, the temperature adjusted to 95° F., and ethylene was added so as to maintain reactor pressure at 200 p.s.i.g. (after purging the N₂). The temperature was maintained at 95 to 113° F. while adding ethylene at this pressure for two hours.

The polymer formed was purified by filtering, boiling with water containing HCl, further washing with water and then finally washing with acetone. The wet polymer was then dried overnight in a vacuum oven at about 80° C. The recovered solid polyethylene weighed 252 grams. It had a crystalline melting point (determined by loss of birefringence) of 130° C., a density of 0.953 gms./cc. and a melt index at 310° C. (5×) of 1.35. Its tensile strength was 5300 p.s.i., yield strength 3550 p.s.i. and elongation at break 440 percent.

EXAMPLE II

A one liter round bottom glass flask, which was mounted in a heating mantle controlled by a variable transformer, and equipped with a side arm and a thermowell containing a thermo-couple attached to an automatic temperature recorder, was charged with 1.5 grams of triethylsilane, 300 milliliters of n-heptane and 0.5 gram of aluminum trichloride; all of the materials were substantially dry and charged under a dry nitrogen atmosphere. The flask was heated to 180° F. for 2 hours at a pressure of 5 p.s.i.g., and then allowed to cool to 135° F. The flask was shaken during the heating period by means of a mechanical shaker.

To this flask was then added 0.5 milliliter of bis(triethylsilyl)chromate and the flask was then pressurized with ethylene until a pressure of 20 p.s.i.g. was reached. The ethylene was introduced for a period of 2 hours and the temperature of the mixture during the 2 hour period was maintained at 135° F.

The polymer formed was purified by filtering, boiling with water containing MCl, further washing with water and then finally washing with acetone. The wet polymer was then dried overnight in a vacuum oven at about 80° C. The recovered polyethylene weighed 4.2 grams.

EXAMPLE III

Employing the procedure of Example II, a round bottom flask was charged with 2.2 grams of triethylsilane, 300 milliliters of n-heptane and 0.75 gram of aluminum trichloride, all of the above materials being substantially dry and charged under a dry nitrogen atmosphere. The flask was heated for 2 hours at a temperature of 180° F. and at a pressure of 5 p.s.i.g., and then permitted to cool to 135° F.

To the flask was then added 0.5 milliliter of bis-(triethylsilyl)chromate and the flask was then pressurized with ethylene until a pressure of 20 p.s.i.g. was reached. The ethylene was introduced for 2 hours and the temperature of the flask was maintained at 135° F.

The solid polyethylene was purified and isolated according to the procedure described above, and it weighed 25 grams.

EXAMPLE IV

The same procedure described under Example II was followed in the instant example, except that 3 grams of triethylsilane and 1 gram of aluminum trichloride were used in the present run. The reaction conditions and purification procedures were as above described; the solid polymer yield was 9 grams.

EXAMPLE V

A round bottom glass flask was charged with 0.7 gram of triethylsilane, 300 milliliters of n-heptane and 1 gram of aluminum trichloride, all of the materials being substantially dry and charged under a dry nitrogen atmosphere. The mixture was heated at 135° F. for one-half hour. At the end of this time, 0.1 milliliter bis(triethylsilyl)chromate was added to the flask and the flask was then pressurized with ethylene until a pressure of 20 p.s.i.g. was reached. The ethylene was introduced for 1½ hours and the temperature of the flask was maintained at 135° F.

The polymer formed was purified by filtering, boiling with water containing HCl, further washing with water and then finally washing with acetone. The wet polymer was dried overnight in a vacuum oven at 80° C. The recovered solid polyethylene polymer weighed 24.6 grams.

EXAMPLE VI

The procedure described in Example V was repeated in the instant example, except that 1.5 grams of triethylsilane and 2 grams of aluminum trichloride were used in place of the amounts stated for these chemicals in Example V. All of the reaction conditions, purification techniques and procedures being as above described, the polyethylene weighed 16.9 grams.

EXAMPLE VII

The procedure described in Example V was followed in the present example, except that 4 grams of aluminum trichloride and 3 grams of triethylsilane were used in place of the amounts stated for these reagents as used in Example V. All of the reaction techniques and purification procedures being as above described, the polyethylene yield weighed 13.1 grams.

EXAMPLE VIII

A round bottom glass flask was charged with 0.7 gram of triethylsilane, 300 milliliters of n-heptane and 1 gram of aluminum trichloride, all of the materials being substantially dry and charged under a dry nitrogen atmosphere. The mixture was heated to 135° F. for one-half hour at a pressure of 5 p.s.i.g. To the flask was then added 0.5 gram of bis(trimethylsilyl)chromate, and ethylene. The ethylene was introduced into the flask until a pressure of 20 p.s.i.g. was reached. Heating was discontinued and polymer formation was evident from the time the ethylene was introduced into the flask. The ethylene was introduced into the flask for 1½ hours keeping the temperature and pressure as noted.

The solid polyethylene formed was purified by filtering, boiling with water containing HCl, further washing with water and then finally washing with acetone. The wet polymer was dried overnight in a vacuum oven at 80° C. The polyethylene yield weighed 17 grams.

When the polymerization was repeated except that 0.5 milliliter of bis(trimethylsilyl)chromate was used instead of 0.5 gram, and 3 grams of triethylsilane were used instead of 0.7 gram, the recovered solid polyethylene product from the 1½ hour run weighed 30.7 grams.

EXAMPLE IX

The same procedure as utilized in Example VIII was adhered to in this example, except that 1 milliliter of tri(n-propyl)silane was employed in place of the silane used in Example VIII. All the reaction, isolation and purification procedures being as above described, the yield weighed 9.8 grams.

EXAMPLE X

The procedure of Example VIII was followed in the present run except that 1 milliliter of triisopropylsilane was used in place of the silane employed in that example. The reaction, isolation and purification techniques being as above described, the polyethylene yield weighed 6.2 grams.

EXAMPLE XI

Following the procedure of Example VIII, except that 0.81 gram of triallylsilane was used in place of the triethylsilane, and all the reaction conditions, isolation and purification procedures being as above employed, the instant run produced about 0.1 gram of solid polyethylene.

EXAMPLE XII

Repeating the procedure of Example VIII, with the exception that 0.8 gram of tri(n-hexyl)silane was used for the silane previously employed, and 0.5 milliliter of bis(triethylsilyl)chromate was used instead of the chromate there used, the solid polyethylene yield was 6.1 grams in a 2 hour polymerization time.

EXAMPLE XIII

Example I was repeated except that 0.4 gram of bis(triethylsilyl)chromate was used, temperature during polymerization was maintained at 131–138° F. and the pressure at 100 p.s.i.g. In the two hour reaction period 102 grams of solid polyethylene having a density of 0.949 gram/cc., a crystalline melting point of 130° C. and a melt index at 310° C. (5×) of 2.5 was recovered. Tensile strength, yield strength and elongation as break were substantially the same as the polymer of Example I.

EXAMPLE XIV

A round bottom glass flask was charged with 1.2 grams of triphenylsilane, 300 milliliters of n-heptane and 1 gram of aluminum trichloride, all the materials being substantially dry and charged under a dry nitrogen atmosphere. The flask was heated for ½ hour at 135° F. Next, 0.5 gram of bis(trimethylsilyl)chromate was added to the flask and the flask was then pressurized with ethylene until a pressure of 20 p.s.i.g. was reached. The ethylene was introduced into the flask for 1½ hours at 135° C. and then stopped.

Thet polymer formed was purified by filtering, boiling with water containing HCl, further washing with water and then finally washing with acetone. The wet polymer was then dried overnight in a vacuum oven at about 80° C. The solid polyethylene produced weighed 12 grams.

EXAMPLE XV

Following the procedure used in Example XIV, a round bottom glas flask was charged with 1 gram of diphenylsilane in place of the triphenylsilane. All of the reaction conditions, and purification procedures were as above described in Example XIV, and the solid polyethylene yield was 3.2 grams.

EXAMPLE XVI

In the instant example when 0.9 gram of tribenzylsilane was used in place of the triphenylsilane of Example XIV, and the reaction procedures and purification techniques were as above described, about 0.1 gram of solid polyethylene was produced.

EXAMPLES XVII AND XVIII

Repeating the procedure of Example XIV except that 1 milliliter of diphenylmethylsilane was used instead of the silane of that example, the solid polyethylene yield was 5 grams. When the procedure of Example XIV was repeated using 1 milliliter of methyldibenzylsilane, the yield of solid polyethylene was 2.2 grams.

EXAMPLE XIX

Example I was repeated except that 1.2 gram bis(tributylsilyl)chromate was used instead of the bis(triethylsilyl)chromate and the polymerization temperature was 165° F. In the 2 hour reaction period 73 grams of solid polyethylene having a density of 0.948 gram/cc., a crystalline melting point of 131° C., a melt index at 310° C. of 0.08, a tensile strength of 4650 p.s.i., a yield strength of 3240 p.s.i. and an elongation at break of 310 percent was recovered.

EXAMPLE XX

A round bottom glass flask was charged with 0.5 milliliter bis(trimethylsilyl)chromate, 300 milliliters of n-heptane, 1 gram of aluminum trichloride and 0.4 gram of triethylsilane, $(C_2H_5)_3SiH$, all of the materials being substantially dry and being charged under a dry nitrogen atmosphere. The mixture was heated to 135° F. and then was pressurized with ethylene until a pressure of 20 p.s.i.g. was reached. Ethylene was introduced for a period of 2 hours under the stated temperature and pressure conditions.

The polymer was purified by filtering, boiling with water containing HCl, further washing with water and then finally washing with acetone. The wet polymer was then dried overnight in a vacuum oven at about 80° C. The recovered solid polyethylene weighed 2.4 grams.

EXAMPLE XXI

A round bottom flask was charged with 0.5 milliliter of bis(trimethylsilyl)chromate, 300 milliliters of n-heptane, 1 gram of aluminum trichloride and 0.7 gram of triethylsilane, all the materials being substantially dry and being charged under a dry nitrogen atmosphere. The mixture was heated to 135° F. and then pressurized with ethylene until a pressure of 20 p.s.i.g. was reached. Ethylene was introduced for 2 hours under such temperature and pressure conditions.

The recovered polyethylene was isolated and purified by filtering, boiling with water containing HCl, further washing with water and then finally washing with acetone. The wet polymer was then dried overnight in a vacuum oven at about 80° C. The recovered polyethylene weighed 34.8 grams.

EXAMPLE XXII

A round bottom glass flask was charged with 0.5 milliliter of bis(trimethylsilyl)chromate, 300 milliliters of n-heptane, 2 grams of aluminum trichloride and 0.7 gram of triethylsilane, all the materials being substantially dry and being charged under a dry nitrogen atmosphere. Following the reaction conditions and purification procedures described in Example XXI, the recovered solid polyethylene weighed 14.8 grams.

An attempt was made to repeat the foregoing polymerization described in Example XXI by (1) substituting 0.5 milliliter bis(triethylsilyl)chromate for the chromate of the above examples and (2) omitting the silane. No detectable polymer was produced. Also, when 0.5 gram of bis(triethylsilyl)chromate and 0.7 gram of triethylsilane were used and the aluminum halide was omitted, the results were also negative; no polymer was produced.

EXAMPLE XXIII

A round bottom glass flask was charged with 3 grams of triethylsilane, 300 milliliters of n-heptane and 1 gram of aluminum triiodide. All of the materials were substantially dry and charged under a dry nitrogen atmosphere. The mixture was heated to 175° F. for 1 hour at a nitrogen pressure of 5 p.s.i.g. and then allowed to cool to 135° F.

To the above flask was then added 0.5 milliliter of bis(triethylsilyl)chromate and the flask was then purged and pressurized with ethylene until a pressure of 20 p.s.i.g. was reached. The ethylene was introduced for a period of 2 hours at 20 p.s.i.g., and the temperature of the flask during this time was maintained at about 135° F.

The polymer formed was purified by filtering, boiling with water containing HCl, further washing with water and then finally washing with acetone. The wet polymer was then dried overnight in a vacuum oven at about 80° C. The recovered solid polyethylene weighed 0.2 gram.

EXAMPLE XXIV

A round bottom flask was charged with 0.7 gram of triethylsilane, 300 milliliters of n-heptane and 1 gram of aluminum tribromide; all of the materials were substantially dry and charged under a dry nitrogen atmosphere. The mixture was heated to 175° F. for 1 hour at a pressure of 5 p.s.i.g. and then allowed to cool to 135° F.

To the above flask was then added 0.5 milliliter of bis(triethylsilyl)chromate and the flask was then purged and pressurized with ethylene until a pressure of 20 p.s.i.g. was reached. The ethylene was introduced for a period of 2 hours at 20 p.s.i.g., and the temperature of the flask was maintained at about 135° F. during this time.

The polymer formed was purified by filtering, boiling with water containing HCl, further washing with water and then finally washing with acetone. The wet polymer was then dried overnight in a vacuum oven at about 80° C. The recovered solid polyethylene weighed 8.5 grams.

EXAMPLE XXV

A round bottom glass flask was charged with 300 milliliters of n-heptane, 0.1 milliliter of $CrO_2Cl_2$, chromyl chloride, and 0.4 milliliter of trimethylethoxysilane. All of the reagents were substantially dry and were intimately mixed with agitation. The flask was charged with dry nitrogen until a pressure of 5 p.s.i.g. was reached and heated to 135° F. These contacting conditions were maintained for 1 hour. Next, 1 gram of aluminum chloride and 0.7 gram of triethylsilane were added to the flask and again the reaction proceeded for 1 hour at 135° F.

At this time, the nitrogen pressure was released and the flask was then flushed with ethylene and pressurized with ethylene until a pressure of 20 p.s.i.g. was reached. The ethylene was introduced for 2 hours at this pressure, and the temperature was kept at 135° F. during this time.

The solid polyethylene polymer formed was filtered, washed and purified by the techniques as described under Example I. The polyethylene yield was 7 grams.

EXAMPLE XXVI

The procedure of Example XXV was followed in the instant run, except that 0.18 milliliters of dimethyldiethoxysilane was employed instead of the trimethylethoxysilane of the above example. All of the other reagents, contacting conditions, reaction procedures and purification means being as above, the recovered polyethylene weighed 4.5 grams.

EXAMPLE XXVII

Example XXV was repeated but 0.24 milliliter of methylvinyldiethoxysilane was substituted for the above used alkoxysilane; all other reagents, contacting techniques, reaction procedures and purification steps being as above described, the polyethylene yield weighed 5 grams.

EXAMPLE XXVIII

The procedures of Example XXV were followed in the instant run, except that 0.18 milliliter of allyltriethoxysilane was used in place of the above used alkoxysilane. All other conditions were as above described; the recovered polyethylene weighed 3.1 grams.

EXAMPLE XXIX

Example I was repeated except that 1.5 gram of bis(triphenylsilyl)chromate was used instead of the triethylsilylchromate and the polymerization reaction temperature was held at 131° F. during the 2 hour polymerization period. 69 grams of solid polyethylene having a density of 0.9635 gram/cc., a crystalline melting point of 131° C., a melt index of 0.08 (5×) measured at 310° C., a tensile strength of 3600 p.s.i., a yield strength of 3000 p.s.i. and an elongation at break of 190 percent was recovered.

EXAMPLE XXX

A round bottom flask was charged with 0.7 gram of triethylsilane, 300 milliliters of dry n-heptane and 1 gram of aluminum trichloride, all of the materials being substantially dry and charged under a dry nitrogen atmosphere. The mixture was heated to 135° F. for one-half hour. At the end of this time, 0.2 gram of bis(triethylsilyl)chromate was added to the flask and the flask was then flushed with ethylene and pressurized with 1,3-butadiene until a pressure of 20 p.s.i.g. was reached. The 1,3-butadiene was introduced at this pressure for 2 hours and for this time the temperature of the flask was maintained at 135° F., after which the reactor was vented and opened.

The solid polybutadiene rubber formed was purified by filtering, boiling with water containing HCl, further washing with water and then finally washing with acetone. The wet polymer was dried overnight in a vacuum oven at 80° C. The recovered rubbery polybutadiene weighed 2 grams.

EXAMPLE XXXI

Example XXX was repeated except that the 1,3-butadiene was introduced for 6 hours instead of 2 hours and 3 grams of triethylsilane were used instead of the 1 gram in Example XXX. The solid polybutadiene recovered was 6 grams.

EXAMPLE XXXII

Another run was made as in Example XXXI except that 0.5 gram of bis(triphenylsilyl)chromate was used instead of the bis(triethylsilyl)chromate of that example, the polymerization temperature was 190° F., and the duration of the run was 5 hours instead of 6 hours. The solid polybutadiene recovered was shown by infrared analysis to have a structure of about 79% cis 1,4; about 13% trans 1,4 and about 8% 1,2.

EXAMPLE XXXIII

Example XXXI was repeated except that 48 grams of triphenylsilane were employed instead of the triethylsilane. The solid polybutadiene recovered weighed 3.2 grams.

EXAMPLE XXXIV

Example XXXI was repeated except that 4 grams of diphenylsilane were employed in place of the triethylsilane of that example. Solid polybutadiene was recovered in the amount of 7 grams.

EXAMPLE XXXV

The silyl chromate catalyst component for this example was made by heating 12 grams of diphenylsilanediol with 6 grams of $CrO_3$ in 200 ml. of glacial acetic acid for three hours at 50° C. After three hours the orange-yellow solid was filtered and washed many times to remove unreacted $CrO_3$ and other impurities. After drying for one hour under vacuum at 70° C. the solid organge-yellow silyl chromate weighed 11.0 grams.

The procedure of Example V was repeated in all details except that 0.5 gram of the silyl chromate prepared as above described was substituted for the silyl chromate set forth in Example V. The recovered solid polyethylene weighed 5.5 grams.

EXAMPLE XXXVI

The silyl chromate employed in this example was prepared in situ in the reaction dispersion medium, n-heptane, by heating a mixture of 0.17 gram of tetramethyldisiloxane-1,3-diol with 0.1 gram of $CrO_3$ and 1 gram of $Na_2SO_4$ dispersed in 300 ml. of n-heptane under nitrogen for ½ hour at 135° F. Then 0.7 gram of triethyl silane and 1 gram of $AlCl_3$ were added to the mixture, and ethylene was introduced. After flushing $N_2$ from the vapor space, the ethylene was continually introduced to hold a pressure in the autoclave of 20 p.s.i.g. during the ensuing 2 hour reaction period. Recovery of the polymer was according to the procedure set forth in Example II, and the solid polyethylene product weighed 1.1 grams.

EXAMPLE XXXVII

The silyl chromate employed in this example was prepared in situ in the reaction dispersion medium, n-heptane, by heating a mixture of 0.15 gram of diisopropylsilanediol with 0.1 gram of $CrO_3$ dispersed in 300 ml. of n-heptane under nitrogen for 1 hour at 135° F. Then 0.7 gram of triethyl silane and 1 gram of $AlCl_3$ were added to the mixture, heating continued for another hour when ethylene was introduced. After flushing $N_2$ from the vapor space, the ethylene was continually introduced to hold a pressure in the autoclave of 20 p.s.i.g. during the ensuing 2 hour reaction period. Recovery of the polymer was according to the procedure set forth in Example II, and the solid polyethylene product weighed 3.2 grams.

EXAMPLE XXXVIII

A round bottom glass flask was charged with 0.5 gram of di-1-napthylsilane, 300 milliliters of n-heptane and 0.5 gram of aluminumtrichloride. All of the materials were substantially dry and charged under a dry nitrogen atmosphere. The mixture was heated to 180° F. for 2 hours under a slight nitrogen pressure and then allowed to cool to 135° F.

To the above flask was then added 0.5 milliliter of bis (triethylsilyl)chromate and the flask was then purged and pressured with ethylene until a pressure of 20 p.s.i.g. was reached. The ethylene was introduced for a period of 2 hours at 20 p.s.i.g., and the temperature of the reaction mask in the flask during this time was maintained at about 135° F.

The polymer formed was purified by filtering, boiling with water containing HCl, further washing with water and finally washing with acetone. The wet polymer was then dried overnight in a vacuum oven at about 80° C. The recovered solid polyethylene weighed 1 gram.

As will be evident to those skilled in the art, modifications of this invention can be made or followed in the light of the foregoing disclosure without departing from the spirit and scope of the disclosure or from the scope of the claims.

I claim:

1. As a new catalytic composition of matter, an admixture consisting essentially of
   (1) a hyrdocarbylsilylchromate compound having the formula

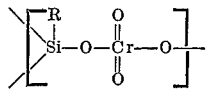

wherein R is a hydrocarbyl group having from 1 to 14 carbon atoms,
   (2) a hydrocarbylsilane having the formula $R'_{4-n}SiH_n$ wherein $n$ is from 1 to 3 and R' is a hydrocarbyl group containing from 1 to 10 carbon atoms, and
   (3) a compound

where X is a halogen with an atomic number from 17 to 53, G is X or a radical —OR' where R' is as before defined.

2. A catalytic composition according to claim 1 wherein each G is X.

3. As a new catalytic composition of matter, an admixture consisting essentially of
   (1) a bis-hydrocarbylsilylchromate of the formula

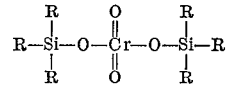

wherein R is a hydrocarbyl group as before defined.
   (2) a hydrocarbylsilane having the formula $R'_{4-n}SiH_n$ wherein $n$ is from 1 to 3 and R' is a hydrocarbyl group containing from 1 to 10 carbon atoms, and
   (3) a compound

where X is a halogen with an atomic number from 17 to 53, G is X or a radical —OR' where R' is as before defined.

4. A catalytic composition according to claim 3 wherein each G is X.

5. A catalyst composition of claim 1 dispersed in a liquified dispersing medium essentially inert to chemical reaction with the components of said catalyst.

6. A catalyst composition of claim 2 dispersed in a liquified dispersing medium essentially inert to chemical reaction with the components of said catalyst.

7. A catalyst composition of claim 3 dispersed in a liquified dispersing medium essentially inert to chemical reaction with the components of said catalyst.

8. A catalyst composition of claim 4 dispersed in a liquified dispersing medium essentially inert to chemical reaction with the components of said catalyst.

9. A method for polymerizing an olefinically unsaturated hydrocarbon containing at least one terminal carbon-to-carbon double bond which comprises intimately contacting said hydrocarbon with a catalytic admixture set forth in claim 1.

10. A method for polymerizing an olefinically unsaturated hydrocarbon containing at least one terminal carbon-to-carbon double bond which comprises intimately contacting said hydrocarbon with a catalytic admixture set forth in claim 2.

11. A method for polymerizing ethylene which comprises intimately contacting said ethylene with a catalytic admixture set forth in claim 1.

12. A method for polymerizing ethylene which comprises intimately contacting said ethylene with a catalytic admixture set forth in claim 2.

13. A method for polymerizing ethylene which comprises intimately contacting said ethylene with a catalytic admixture set forth in claim 3.

14. A method for polymerizing ethylene which comprises intimately contacting said ethylene with a catalytic admixture set forth in claim 4.

15. A method for polymerizing ethylene which comprises intimately contacting said ethylene with a catalytic admixture set forth in claim 7.

16. A method for polymerizing ethylene which comprises intimately contacting said ethylene with a catalytic admixture set forth in claim 8.

17. A method for polymerizing 1,3-butadiene which comprises intimately contacting said 1,3-butadiene with a catalytic admixture set forth in claim 1.

18. A method for polymerizing 1,3-butadiene which comprises intimately contacting said 1,3-butadiene with a catalytic admixture set forth in claim 2.

19. A method for polymerizing 1,3-butadiene which comprises intimately contacting said 1,3-butadiene with a catalytic admixture set forth in claim 3.

20. A method for polymerizing 1,3-butadiene which comprises intimately contacting said 1,3-butadiene with a catalytic admixture set forth in claim 4.

21. A method for polymerizing 1,3-butadiene which comprises intimately contacting said 1,3-butadiene with a catalytic admixture set forth in claim 7.

22. A method for polymerizing 1,3-butadiene which comprises intimately contacting said 1,3-butadiene with a catalytic admixture set forth in claim 8.

23. As a new catalytic composition of matter, an admixture consisting essentially of
(1) a hydrocarbylsilylchromate compound having the formula

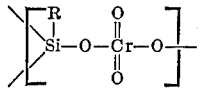

wherein R is a hydrocarbyl group having from 1 to 14 carbon atoms,
(2) a hydrocarbylsilane having the formula

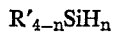

wherein $n$ is from 1 to 3 and R' is a hydrocarbyl group containing from 1 to 10 carbon atoms, and
(3) a compound

where G is a radical —OR' where R' is as before defined.

24. A method for polymerizing an olefinically unsaturated hydrocarbon containing at least one terminal carbon-to-carbon double bond which comprises intimately contacting said hydrocarbon under polymerization conditions with a catalytic admixture set forth in claim 23.

25. As a new catalytic composition of matter, an admixture consisting essentially of (1) a hydrocarbylsilylchromate compound having the formula

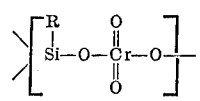

wherein R is a hydrocarbyl group having from 1 to 14 carbon atoms, and
(2) a hydrocarbylsilane having the formula

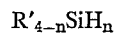

wherein $n$ is from 1 to 3 and R' is a hydrocarbyl group containing from 1 to 10 carbon atoms, and
(3) $AlCl_3$ 26. A method for polymerizing an olefinically unsaturated hydrocarbon containing at least one terminal carbon-to-carbon double bond which comprises intimately contacting said hydrocarbon under polymerization conditions with a catalytic admixture set forth in claim 25.

27. A catalyst composition of claim 23 dispersed in a liquified dispersing medium essentially inert to chemical reaction with the components of said catalyst.

28. As a new catalytic composition of matter, an admixture consisting essentially of
(1) a bis-hydrocarbylsilylchromate of the formula

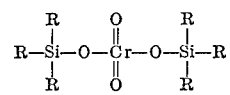

where R is a hydrocarbyl group as before defined
(2) a hydrocarbylsilane having the formula

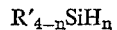

wherein $n$ is from 1 to 3 and R' is a hydrocarbyl group containing from 1 to 10 carbon atoms, and
(3) a compound

where G is a radical —OR' where R' is as before defined.

29. A catalyst composition of claim 28 dispersed in a liquified dispersing medium essentially inert to chemical reaction with the components of said catalyst.

30. As a new catalytic composition of matter, an admixture consisting essentially of
(1) a bis-hydrocarbylsilylchromate of the formula

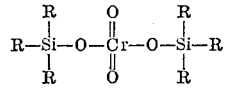

where R is a hydrocarbyl group as before defined and
(2) a hydrocarbylsilane having the formula

wherein $n$ is from 1 to 3 and R' is a hydrocarbyl group containing from 1 to 10 carbon atoms, and
(3) $AlCl_3$ 31. A catalyst composition of claim 30 dispersed in a liquified dispersing medium essentially inert to chemical reaction with the components of said catalyst.

32. A new catalytic composition of matter according to claim 31 wherein R' is an aliphatic hydrocarbon group containing 1 to 6 carbon atoms.

33. A composition of matter according to claim 32 wherein said hydrocarbylsilane is triethylsilane.

34. A method for polymerizing ethylene which comprises intimately contacting said ethylene with a catalytic admixture set forth in claim 32.

35. A method for polymerizing 1,3-butadiene which comprises intimately contacting said 1,3-butadiene with a catalytic admixture set forth in claim 32.

References Cited

UNITED STATES PATENTS

| | | | |
|---|---|---|---|
| 3,208,954 | 9/1965 | Rindtorff et al. | 252—442 |
| 3,324,095 | 6/1967 | Carrick et al. | 260—88.2 |
| 3,324,101 | 6/1967 | Baker et al. | 260—94.9 |
| 3,227,702 | 1/1966 | Small et al. | 260—94.9 |

JOSEPH L. SCHOFER, Primary Examiner

R. A. GAITHER, Assistant Examiner

U.S. Cl. X.R.

252—431, 459; 260—93.7, 94.9